(12) United States Patent
Wells et al.

(10) Patent No.: US 10,478,729 B1
(45) Date of Patent: Nov. 19, 2019

(54) SYSTEM AND METHOD FOR DYNAMIC GENERATION AND INTEGRATION OF INTERACTIVE TEXTUAL VIDEO GAME CONTENT

(71) Applicant: MUSIC POWERED GAMES, LLC, Huntsville, AL (US)

(72) Inventors: Robert V. Wells, Huntsville, AL (US); Brian K. Mitchell, Huntsville, AL (US)

(73) Assignee: Music Powered Games, LLC, Huntsville, AL (US)

( * ) Notice: Subject to any disclaimer, the term of this patent is extended or adjusted under 35 U.S.C. 154(b) by 0 days.

(21) Appl. No.: 16/367,506

(22) Filed: Mar. 28, 2019

Related U.S. Application Data

(60) Provisional application No. 62/742,409, filed on Oct. 7, 2018.

(51) Int. Cl.
  *A63F 13/533* (2014.01)
  *A63F 13/35* (2014.01)

(52) U.S. Cl.
  CPC .......... *A63F 13/533* (2014.09); *A63F 13/35* (2014.09)

(58) Field of Classification Search
  CPC ... A63F 13/10; A63F 13/814; A63F 2300/303
  See application file for complete search history.

(56) References Cited

U.S. PATENT DOCUMENTS

| | | | |
|---|---|---|---|
| 8,715,077 B2 | 5/2014 | Paradise et al. | |
| 9,067,140 B2 | 6/2015 | Opaluch | |
| 9,256,888 B2 | 2/2016 | Chow et al. | |
| 9,401,941 B2 | 7/2016 | Juristovski et al. | |
| 9,594,748 B2 | 3/2017 | Gifford et al. | |
| 9,633,379 B1* | 4/2017 | Perry | G06T 15/00 |
| 2005/0255914 A1* | 11/2005 | McHale | A63F 13/10 463/31 |
| 2009/0104956 A1* | 4/2009 | Kay | A63F 13/10 463/7 |
| 2010/0023966 A1* | 1/2010 | Shahraray | H04N 5/44543 725/34 |
| 2013/0102393 A1 | 4/2013 | Willis | |
| 2017/0065889 A1 | 3/2017 | Cheng | |
| 2017/0201779 A1* | 7/2017 | Publicover | H04W 4/21 |

* cited by examiner

*Primary Examiner* — Reginald A Renwick
(74) *Attorney, Agent, or Firm* — Patterson Intellectual Property Law, P.C.; Gary L. Montle

(57) ABSTRACT

An adaptive video game system and method includes a game server linked to various game clients. A game client executes a user-selected game program, each of one or more selectable game programs comprising specified gameplay objects programmed to interact with dynamic text objects, and further obtains text strings (e.g., constituent letters, words, and phrases) associated with user-defined text sources. The game client dynamically applies text objects generated via a first set of rules associated at least with the selected game program and based on the obtained text strings, to interact with the specified gameplay objects via a second set of rules associated at least with the selected game program. Video game users accordingly may solve presented challenges according with both internally defined video game rules and integrated text strings of externally obtained written works. User performance may be monitored and analyzed for determination of written work retention, user improvement, etc.

20 Claims, 7 Drawing Sheets

SYSTEM AND METHOD FOR DYNAMIC GENERATION AND INTEGRATION OF INTERACTIVE TEXTUAL VIDEO GAME CONTENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/742,409, filed Oct. 7, 2018, and which is hereby incorporated by reference.

BACKGROUND

The present invention relates to a video game system and method which dynamically modifies the content and gameplay of video games using a selection of text from one or more separate textual works.

Many video games incorporate portions of texts or written works as the basis for portions of gameplay, such as the inclusion of written poetic works or musical lyrics. Traditionally, these textual incorporations have been based upon the game developer or programmer selecting a set of predetermined written works for reference. For example, video game developers may choose to include specific poems, lyrics, journal entries, news articles, or other intentionally selected material for purposes of display to the game user and the user's potential interaction therewith.

This traditional method of inclusion requires the game developer to intentionally pre-select which textual works should be included for use within the video game and program any interactive components around the pre-selected text. For example, in many musical video games, the game developer may select songs with certain lyrics and program beats, notes, graphics, sounds, and expected user input. A user may, for example, be expected and prompted to sing lyrics or tap a button in time with the rhythm of the lyrics, but inclusion of such lyrics must be intentionally programmed with respect to the textual elements. The rules and procedures of the game with respect to the textual elements are defined in advance within the programming so that the content displayed in relation to the pre-selected text is also pre-defined in accordance with the text.

What is currently missing from the field is the ability to dynamically integrate textual materials from multiple sources absent pre-selected rule generation pursuant to the text.

BRIEF SUMMARY

The present invention described herein fills this void by dynamically, or upon user action, creating game content and gameplay derived from one or more text sources in accordance with rulesets defined for one or more game systems. As opposed to requiring discrete input of text into the data store and queuing and reference thereof, the present invention permits a game system to pull, aggregate, modify, and integrate text from a plurality of sources absent a text-specific ruleset. Further, in various embodiments, users may be able to create individual game experiences based upon user-specified inclusion of defined or undefined text not necessarily limited to the game brand. For example, a user may be able to input Shakespearian sonnets into a music game or song lyrics into a word puzzle game.

Exemplary systems or methods according to the present disclosure provide for selection or input of one or more written materials such as scripts, advertisements, text messages, lyrics, and the like; dynamic and on-demand adaptation of the text to one or more rulesets for one or more video game experiences; dynamic generation of video game content and gameplay derived from a portion of the text; and presentation of interactive video game content involving the text with which a video game user can interact in accordance with the game ruleset.

An embodiment of a system as disclosed herein includes a communicatively enabled client-server network architecture including a game server for hosting of the game and associated controlling logic, a game client for the rendering of the game and associated controlling logic, one or more communicatively connected databases containing a plurality of written works and associated information material, and a communications network connecting said architectural components. The game client may be hosted upon a communicatively connected user device such as a cell phone or network-accessible game console. Generally, in accordance with the presently described embodiment, a user may be able to request and/or select a written work and associated content from the communicatively connected databases. This content may be referenced by the game server and/or game client and integrated in accordance with the controlling logic thereof and, accordingly, adaptively integrated into the game content to be rendered via the game client for display upon the user device. The work to be integrated may be hosted upon third-party databases such that users may search and query for textual materials not otherwise associated with or stored in reference to the game or games contemplated by the game server or client.

A user may select via the game client a written work from a communicatively connected database. For example, a user may be able to select textual content derived from integrated works, Internet-hosted works, e-books, lyric databases, online libraries, and/or user-inputted text. In an embodiment, the user selection may be computer-assisted, such as where a user plays a portion of a song, the audio thereof received by microphone hardware communicatively connected to the game client, whereby audio processing algorithms determine the identity of the song being played and fetch from a third-party source the textual components and associated materials thereof.

Upon a user's query or selection to include one or more works, the game client may relay the user's selection and the associated work to the game server, including one or more portions of the work. In an embodiment, the game server may compare the user request against an internal database to determine whether a copy of the requested work exists thereupon; if not, the game server may retrieve a copy of the requested work from the one or more communicatively connected databases. In an embodiment, the game server may compare and integrate multiple sources for the work, such as by locally downloading lyrics from one database and associated audio from another database.

In accordance with the associated controlling logic, the game server may integrate the retrieved work and associated materials in accordance with the game rules. In an embodiment, the game server may selectively break down a body of text for a work into one or more text strings, the one or more text strings to be used as interactive content in accordance with the game rules. For example, the game server may break down written works into stanzas, paragraphs, lines, phrases, words, syllables, sounds, characters, letters, and the like.

The game server may send to the game client the one or more associated text strings to be used in accordance with the controlling logic of the game server and/or game client, thereby instruction or permitting the game to use one or more of the text strings in association with the game rulesets. In various embodiments, the game client and game server may further include associated content with the various text strings, such as sound clips associated with the words, metadata, copyright information, attribution, permissions, and the like. The game client may then generate dynamic game content including the one or more provided text strings for user-based interaction. For example, the user may be required to type the letters associated with a text string, perform an in-game function for unlocking or linking text strings, inputting information in accordance with ordered text strings, and the like. Specifically, this may include, as an example, matching, connecting, sliding, tapping, shooting, or otherwise interacting with graphical user elements associated with one or more text strings or components of text strings such that proper interaction in accordance with the video game ruleset is compared with desired results and associated user feedback—for example, scoring a user's accuracy in stringing together text string components or scoring a user's rhythm, pitch, and annunciation of a lyrical text string.

In an embodiment, an adaptive video game system as disclosed herein comprises a game server operably linked via a communications network to a game client residing on a user computing device. The game client is configured to execute a game program selected by a user from one or more game programs, each of the one or more game programs comprising specified gameplay objects programmed to interact one or more dynamic text objects, and further to obtain at least one or more text strings associated with a user-defined text source. The game client then dynamically applies one or more text objects as generated via a first set of rules associated at least with the selected game program and based on the obtained one or more text strings, to interact with the specified gameplay objects via a second set of rules associated at least with the selected game program.

In a related embodiment, the text source may comprise a message delivered from a first user to a second user via a message server, wherein the game client resides on the user computing device associated with the second user and executes a game program selected by the second user to interact with the one or more text objects generated from the at least one or more text strings obtained from the message.

In another related embodiment, a first user-defined text source is selectable via the game client with respect to at least a first set of one or more iterations of the game program, and a second user-defined text source comprises at least a first advertisement selected from an ad campaign associated with an ad server. The game client may execute at least a second set of one or more iterations of the selected game program to interact with one or more text objects generated from at least one or more text strings obtained from the at least first advertisement.

In another related embodiment, an ad client may enable selection by an associated user of one or more advertisements associated with the ad campaign. The ad campaign may be executed in association with at least one of the one or more game programs further in view of one or more game player profile parameters.

In another related embodiment, either or both of the game server and the game client may determine the at least first advertisement from the ad campaign based on an identified one or more game player profile parameters associated a profile of the game player user associated with the user computing device upon which the game client resides.

In another related embodiment, the game client may receive ambient sound data in real time from an audio receiver associated with the user computing device. The ambient sound data may be associated with a defined trigger for one or more advertisements of the ad campaign, wherein the game client executes the at least second set of one or more iterations of the selected game program to interact with one or more text objects generated from at least one or more text strings obtained from the at one or more advertisements associated with the received ambient sound data.

In another related embodiment, the game client may dynamically apply, via the second set of rules associated at least with the selected game program, audio elements associated with the text source in time relation with corresponding elements of the generated one or more text objects.

In another related embodiment, each of the text objects may be parsed into a plurality of sub-text objects, wherein the game client enables the user to interact with the plurality of sub-text objects to arrive at the corresponding text objects during a game.

In another related embodiment, the game client enables the user to provide the user-defined text source via one or more of an online search engine and a list of available text sources corresponding to an online database linked to the game server.

In another related embodiment, the text source is defined by sampling an audio recording and the game server may convert audio data received therefrom into the one or more text strings. Alternatively, the game server may identify one or more text strings associated with the audio recording.

DETAILED DESCRIPTION

Figure 1:
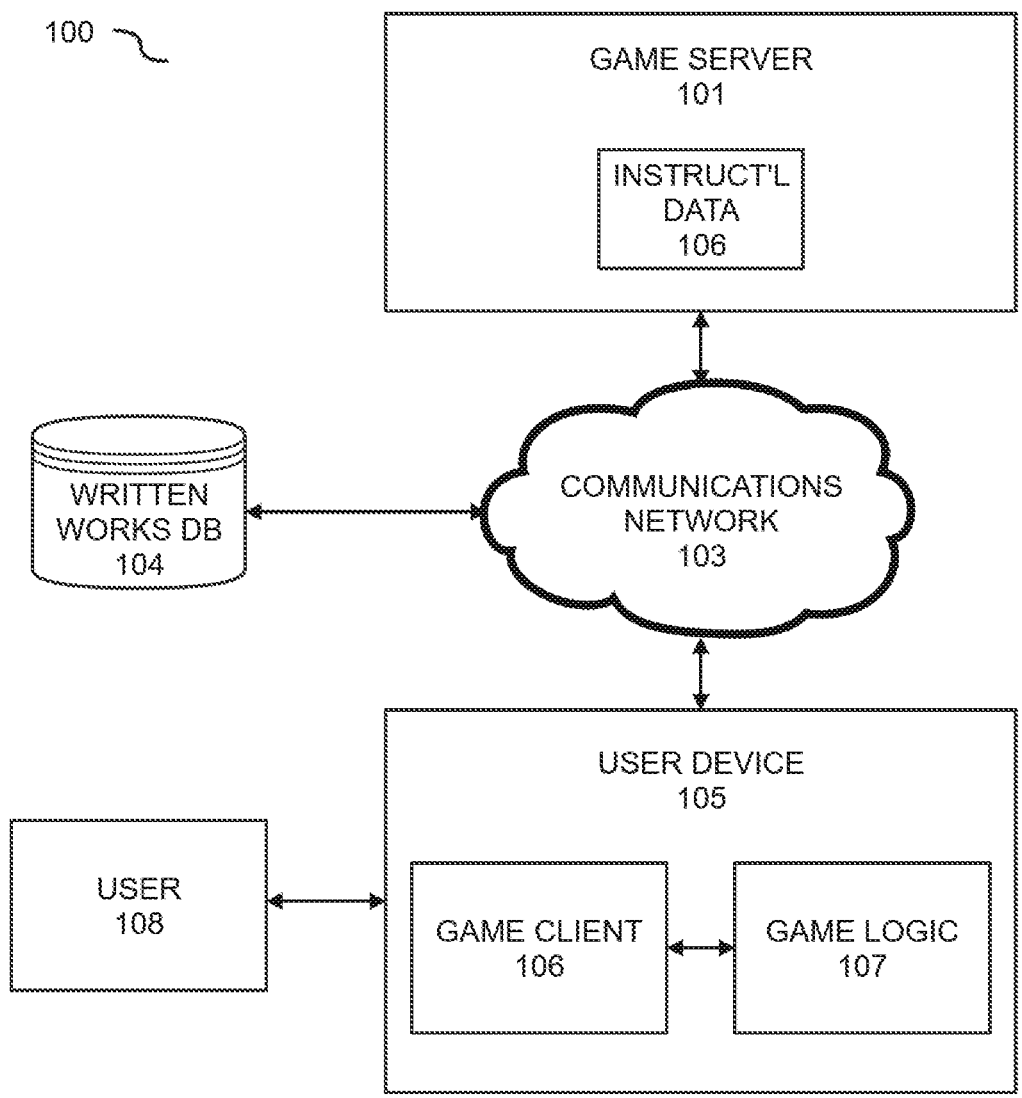
FIG. 1 is a block diagram representing an embodiment of a system for on-demand, dynamic generation and integration of interactive textual video game content.

Referring generally to FIGS. 1-7, various exemplary embodiments of an invention may now be described in detail. Where the various figures may describe embodiments sharing various common elements and features with other embodiments, similar elements and features are given the same reference numerals and redundant description thereof may be omitted below.

In one aspect as disclosed herein, embodiments of a hosted system or method may take the form of a video game server and application as delivered via a computer application, console application, mobile device application, website, or the like.

A conventional embodiment of the systems and methods as disclosed herein may include a video game application executed on a user-based hardware device that is communicatively connected to a game server, the game server further connected to one or more databases of written works, the written works comprising at least text and optionally additional associated information (e.g. author, title, meter, rhythm, pitch, audio, video, images, metadata, copyright information, permissions, album cover, volume, publication information, and the like). A user may query, or in alternative embodiment enter, written works via the game application for inclusion. In an alternative embodiment, a third-party user may specify the written works to be included in accordance with user-associated advertising text.

The system may then retrieve the text and associated information of a written work from the one or more communicatively connected databases, break down the text into one or more text strings, break down the text strings into associated string objects, and associate the one or more text strings and string objects with graphical elements or game objects of one or more video games associated with the game server and/or video game application. In various embodiments, the associated information may additionally be broken down by the system pursuant to the game logic, such that the presentation of string objects and text strings is in accordance with the associated information for each text string or string object element. For example, a text string comprising a portion of a song lyric may be associated and presented along with additional information such as name of the song, author, album cover, publication information, audio snippet, and the like, whereby the user is able to see and hear the associated audiovisual information upon presentation of the text string with the game and pursuant to the game rules and logic.

In various embodiments, the system may further monitor user performance with respect to the one or more text strings via the video game and determine associative performance information therefrom. For example, the game server may determine that a user has completed a text string associated with an advertisement and, accordingly, prevent the display of that text string for a subsequent period of time. In a further embodiment, the game server may determine performance metrics in association with the one or more text strings that are of interest to advertisers, such as, for example, determining that users are more likely to interact with advertisement A as opposed to advertisement B, thereby permitting A/B testing in a video game environment.

Referring first to FIG. 1, an exemplary embodiment of a system 100 for on-demand, dynamic generation and integration of interactive textual video game content as disclosed herein may include a game server 101 comprising instructional data 102 for the processing of written works into text strings, the one or more text strings comprising string objects, into one or more video game applications. The game server 101 may be operatively connected to a communications network 103 and, via the communications network 103, communicatively connected to one or more written work databases 104. The written work databases 104 may in various embodiments comprise a plurality of third-party databases such as lyrics websites, libraries, media servers, and the like. In an embodiment, the written work databases 104 may additionally include first-party databases, wherein the game server 101, per the instructional data 102, copies written works from non-first-party databases to the first party database.

The game server 101 is configured and informed via the instructional data 102, as well as, in certain embodiments, user-provided information, to query the one or more written work databases 104 for written works, process the written works into one or more component text strings (e.g. phrases), further process the text strings into component text elements (e.g. words and/or letters), and configure such text strings and text elements into informational components for association with video game objects.

The game server 101 may further be communicatively connected to a user device 105 hosting one or more video game clients 106, the video game client 106 further comprising video game logic 107. The video game client 106 may be configured in accordance with the game logic 107 to receive text strings from the game server 101 as determined from the one or more written works in association with the written work servers 104 and to integrate said text strings and string objects with one or more objectives of a video game hosted upon the game client 106. The game logic 107 may instruct the game client 106 to implement one or more of the received text strings into the ruleset of the associated game, whereby a user 108 is prompted via the game client 106 to provide interactive feedback using the user device 105 and associated inputs thereto. For example, the game client 106 may display upon a screen on the user device 105 a text string and text objects that are associated with game objects, such that the user must interact with the game objects and associated text objects pursuant to the rules of the game to solve the text string.

In one embodiment, the user 108 associated with the user device 105 may query the game server 101 via the game client 106 for one or more written works to be included in the respective video game the user is playing or intends to play upon the game client 106.

Figure 2:
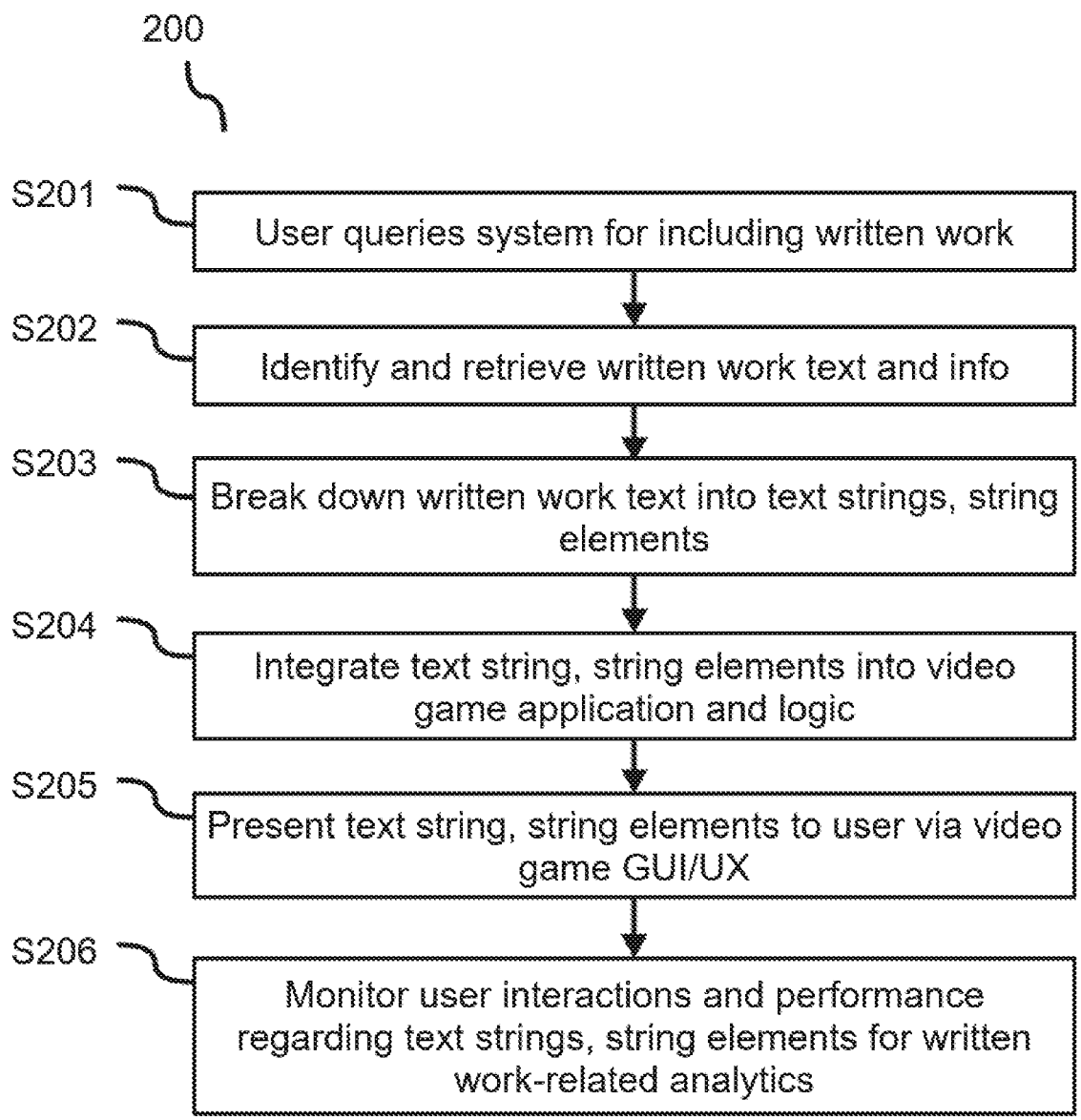
FIG. 2 is a flow diagram representing an embodiment of a process for generating and integrating dynamic textual materials into video game content display and interaction therewith as implemented by the system of FIG. 1.

Referring next to FIG. 2, an exemplary method 200 as disclosed herein for generating and integrating dynamic textual materials into video game content display and interaction therewith may be described in part or in whole as follows. The method 200 may begin at a first step S201 wherein a user queries for the inclusion of a written work. In an embodiment, a user may initiate a search via an application, such as a video game, for a certain written work. For example, a user may search for the title, artist, album, etc. of a piece of music; may search by speaking the text of the written work into a microphone upon a game client; may identify a written work via API instructions (e.g. by "sharing" the written work with the game client via a communicatively connected third-party system); etc.

In step S202, the system identifies the queried written work and retrieves the written work, including the text and associated information thereof, from one or more communicatively connected written work databases. In an embodiment, the system may retrieve written work information from multiple databases and aggregate the information. In another embodiment, where multiple iterations of the written work or information thereof exist, the system may query the user for additional information. For example, a user may request the written work, *The Canterbury Tales*, and the system identifies 410 iterations of 23 published copies. In said example, the system determines four iterations of the written work have the highest match, citation, and popularity rate, including two versions of the original text in Middle English and two different modern translations licensed for use; the system queries which version the user wants, and, upon user specification, identifies the associated iterations and aggregates the written work information from those iterative sources (e.g. text from Amazon, manuscript images from The British Library, information from Wikipedia, synopsis from Sparknotes, etc.).

In step S203, the system breaks down the written work text into one or more text strings, and the one or more text strings into one or more string elements. Continuing the example above, the system may break down the text of *The Canterbury Tales* into chapters, stanzas, and lines (lines being text strings), each line comprising words and letters (each a string element): e.g., a text string "Whan that Aprille with his shoures sote" wherein each word and letter of each word is defined as an associated string element.

In step S204, the system integrates the text string and string elements into a video game in accordance with integration instructions and video game logic. In an embodiment, the system may associate the text string and string elements with variable components of the video game. For example, string elements may be associated with collectible coins for the user to collect in a video game, the collection of all of the coins thereby unlocking the text string and resulting in a desired video game outcome. In an embodiment, the video game ruleset may be modified in accordance with the text string and/or string elements, such as, for example, changing in-game objects in association with the text string and/or string elements. For example, a calendar-based puzzle within the video game may be modified to require the identification of the month of April in association with string elements obtained from *The Canterbury Tales* text, whereas the solution for the same in-game puzzle may be September for string elements derived from the text of the Earth, Wind, and Fire song, "September."

In step S205, the system presents the video game to the user with the associated text strings and string elements for dynamic user interaction via the video game graphical user interface and/or user experience. For example, the user may be required to complete missing words or letters based upon the video game rules (e.g. collecting items, sliding tiles, entering letters, matching elements, etc.).

In an optional step S206, the system may further monitor user performance in association with the presentation of the text strings and/or string elements within the video game and provide analytics in association with said performance. For example, the system may monitor for popularity of certain text strings and associated written works, speed of completion, accuracy, retention, and the like. In an embodiment, such information may be viewable by the performing user or other users in a report. For example, such information may be deemed particularly useful for advertisers associated with written works pursuant to ad text, slogans, trademarks, and the like.

Figure 3:
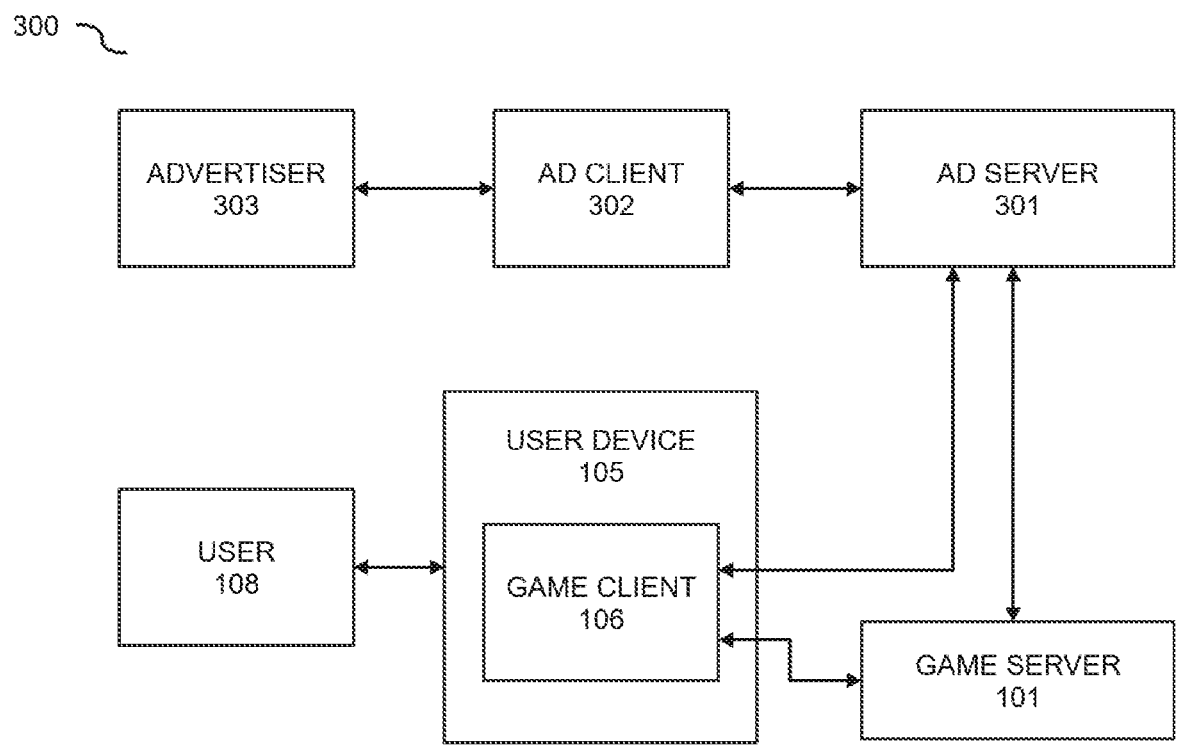
FIG. 3 is a block diagram representing an embodiment of a system for integrating advertising text into the dynamic video game content in accordance with the system of FIG. 1 and method or FIG. 2 and measuring user response thereto.

Referring next to FIG. 3 an exemplary embodiment of a system 300 for integrating advertising text into the dynamic video game content as disclosed herein may be interpreted in accordance with the system and method of FIGS. 1 and 2, respectively. The system 300 may include the game server 101, user device 105, and video game client 106 of system 100, wherein the game server 101, user device 105, and video game client 106 are further communicatively connected to an ad server 301. In an embodiment, the ad server 301 may be identified as a written work database 104. The ad server 301 may further be associated with an ad client 302, whereby the ad client 302 defines ad content and ad parameters as written works to be used by the system 100. For example, the ad server 301 may comprise a plurality of ads including, per one ad client 302, an advertisement for sports drinks with specified advertising parameters. The game server 101 and/or video game client 106 may factor in ad parameters when selecting written work content from the ad server 301, such that advertisements are matched in accordance with advertising parameter instructions to preferable game users 108. For example, the game server 101 may select the sports drink advertisement for display in a competitive shooter video game where the sports drink advertising parameters match with the competitive shooter video game. Matching may be determined in accordance with game-ad fit (e.g., matching written works with videographic content with videographic capable video game), demographic-ad fit (e.g., game popular among women ages 39-45, ad targeted to similar demographic) or user-ad fit (e.g., user specified as 24-year-old competitive male who has not seen the ad within past 30 days and ad targeted is towards same). In an embodiment, the ad server may respond to an ad request from the game server with respect to a given advertisement by returning ad content that is in the queue to be delivered next, based on various criteria such as user demographics, user location, and price for the ad. For example, an advertiser may designate one or more particular ads to be implemented in association with a particular location, wherein upon the user being identified in proximity with the particular location the system triggers the ad to be retrieved for implementation at that time or at a suitable later time when for example an appropriate game is executed.

The ad server 301 may further be configured to monitor ad performance, such as in accordance with step 206 of method 200, for determining advertising viewership and interaction. In an embodiment, advertisers 303 associated with ad clients 302 may view the ad performance statistics determined in accordance with the ad client 302 for the specific advertising campaigns as well as to configure and manage the ad content and parameters via the ad client 302.

Figure 4:
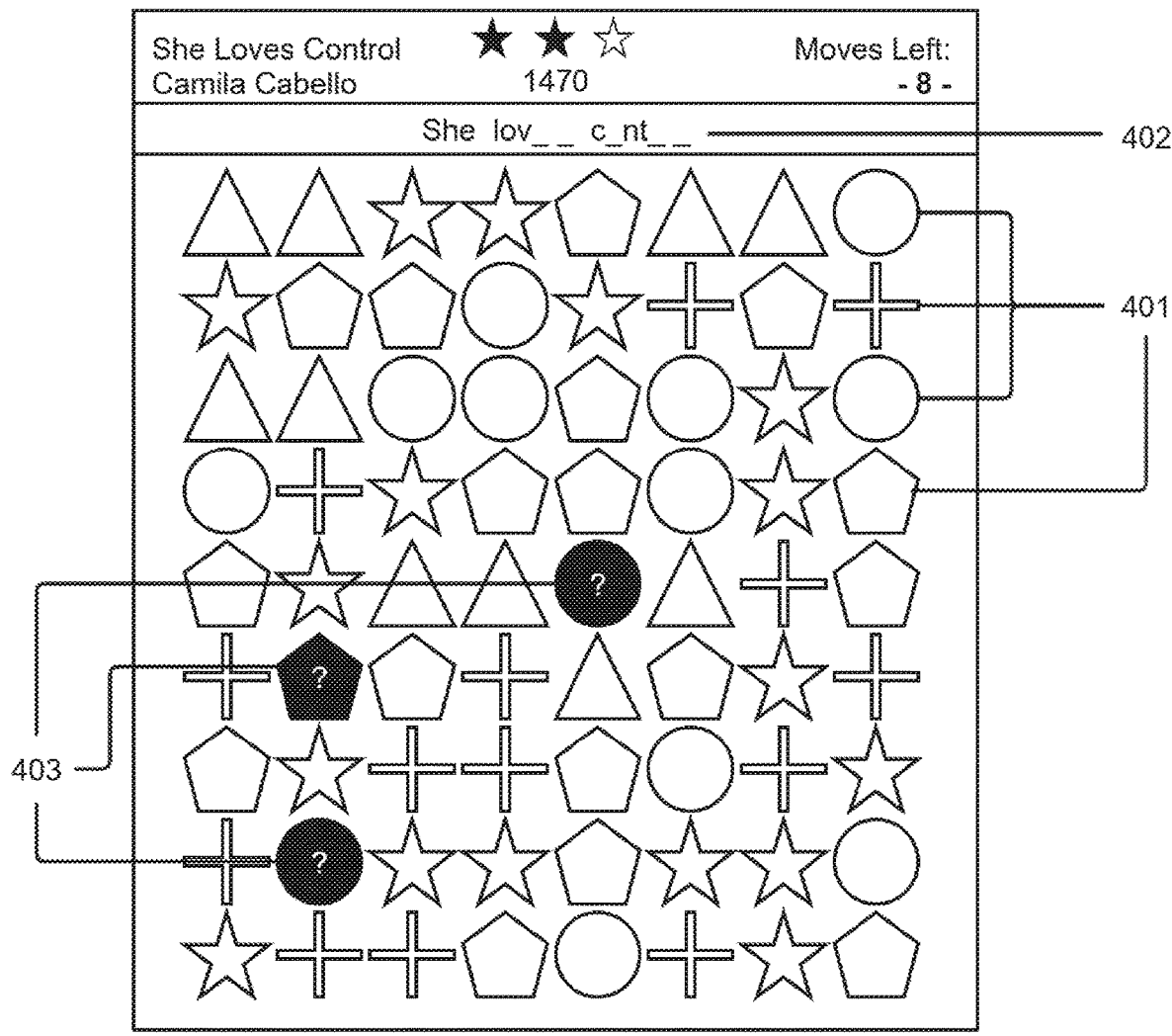
FIG. 4 is a figurative diagram representing an exemplary graphical user interface for a matching game incorporating dynamic textual content in accordance with the present invention.

Referring now to FIG. 4, an exemplary embodiment of a matching game in accordance with the present invention is now described. A traditional item matching game may be provided to a user for the matching of like items, such as by shifting and/or swapping game object to align, group, or otherwise associate like game objects 401. In an embodiment of the game implementing the system and methods described herein, the traditional matching game ruleset may further be augmented with the inclusion of text string matching elements, such as like shapes or like colors. Specifically, a text string 402 determined in accordance with method 200 may be integrated into the user interface and partially censored or obfuscated, prompting the user to complete the censored or missing string objects 403. In an embodiment, the string objects 403 may further be associated and displayed in accordance with one or more respective game objects 401, whereby user input and solution of the game objects in accordance with the matching game ruleset results in the completion of the associated obfuscated string objects 403. Accordingly, a user may complete a level upon successful completion of the text string 402 by solving all game objects 401 associated with a missing string object 403. Other integrations into rulesets may apply, such that certain string object 403 solution or text string 402 completion results in, for example, a score multiplier or an achievement. In various embodiments, metagame rulesets may be applied such that completion of missing string objects 403 or text strings 402 across one or more games may result in a game action, such as a score multiplier or achievement. For example, in one such embodiment, a user may unlock an achievement for completing across multiple games one-hundred text strings 402 wherein the text strings 402 or string objects 403 or combinations thereof are associated with fruits (i.e. "apple of my eye," "orange and purple," "seedy-lookin' individual," "go find your own tree," etc.).

Figure 5:
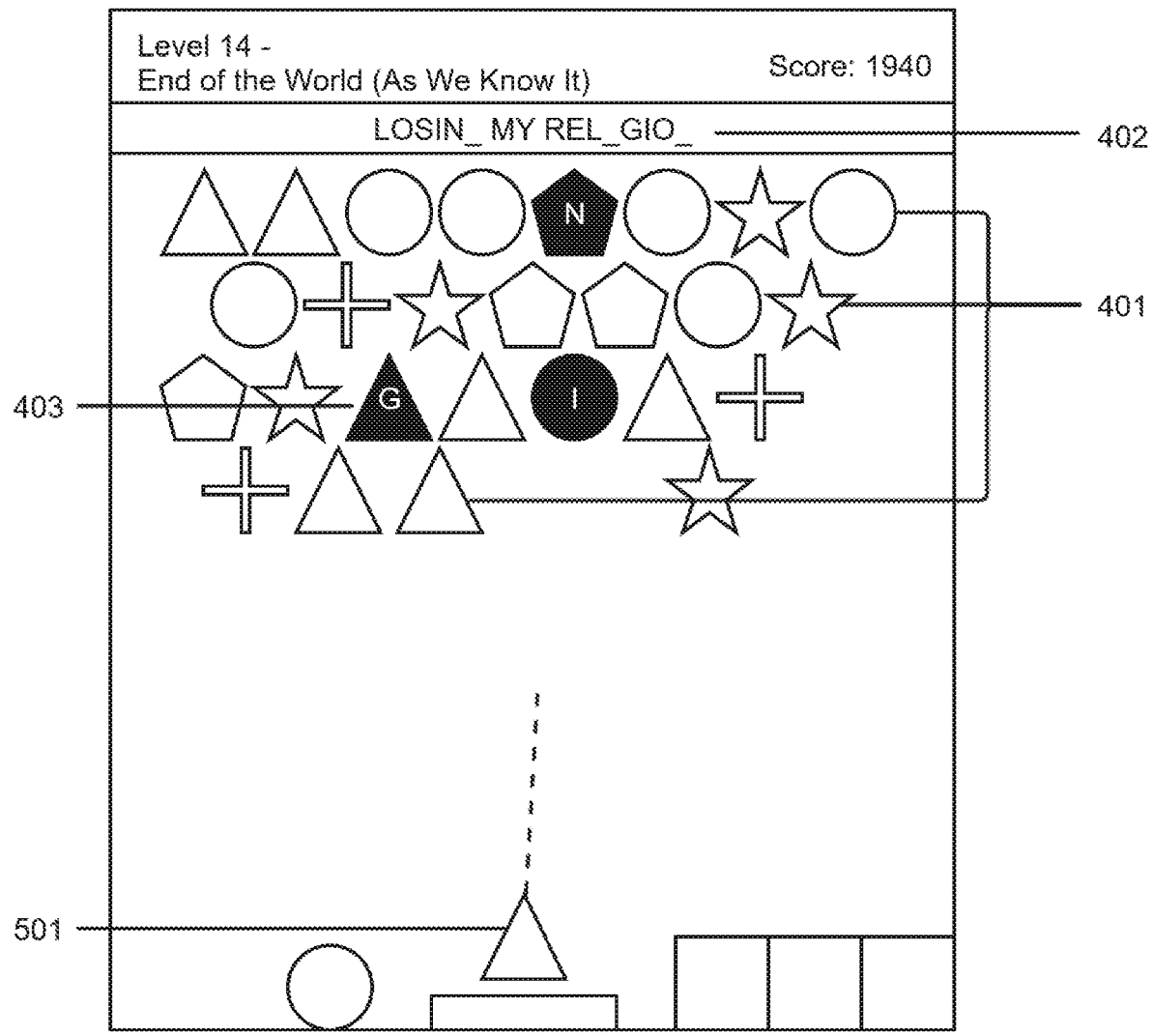
FIG. 5 is a figurative diagram representing an exemplary graphical user interface for a bubble shooter game incorporating dynamic textual content in accordance with the present invention

Referring now to FIG. 5, an exemplary embodiment of a bubble shooter game in accordance with the present invention is now described and may be referentially compared to FIG. 4 with respect to the inclusion and relation of game objects 401, text strings 402, and string objects 403. Traditional bubble shooter games generally involve a physics-based puzzle for launching a specific game object 501 in a manner wherein the specific game object 501 is ultimately placed physically proximate to like game objects 401. In accordance with the present invention, the game may overlay or otherwise integrate string objects 403 in association with a text string 402 to be completed in accordance with the bubble shooter game ruleset. In this embodiment, the matching of the specific game object 501 to the associated like game objects 401 may result in the completion of the associated string object 403 to de-obfuscate the associated element in the text string 402. For example, successfully matching the diamond shapes may result in the string object 403 "G" to be slotted into the associated sixth element of the text string 402, forming the word "losing." Other embodiments of bubble shooter-type text integration may be contemplated, such as including the string object 403 on the specific game object 501 as opposed to the targeted game objects 401.

Figure 6:
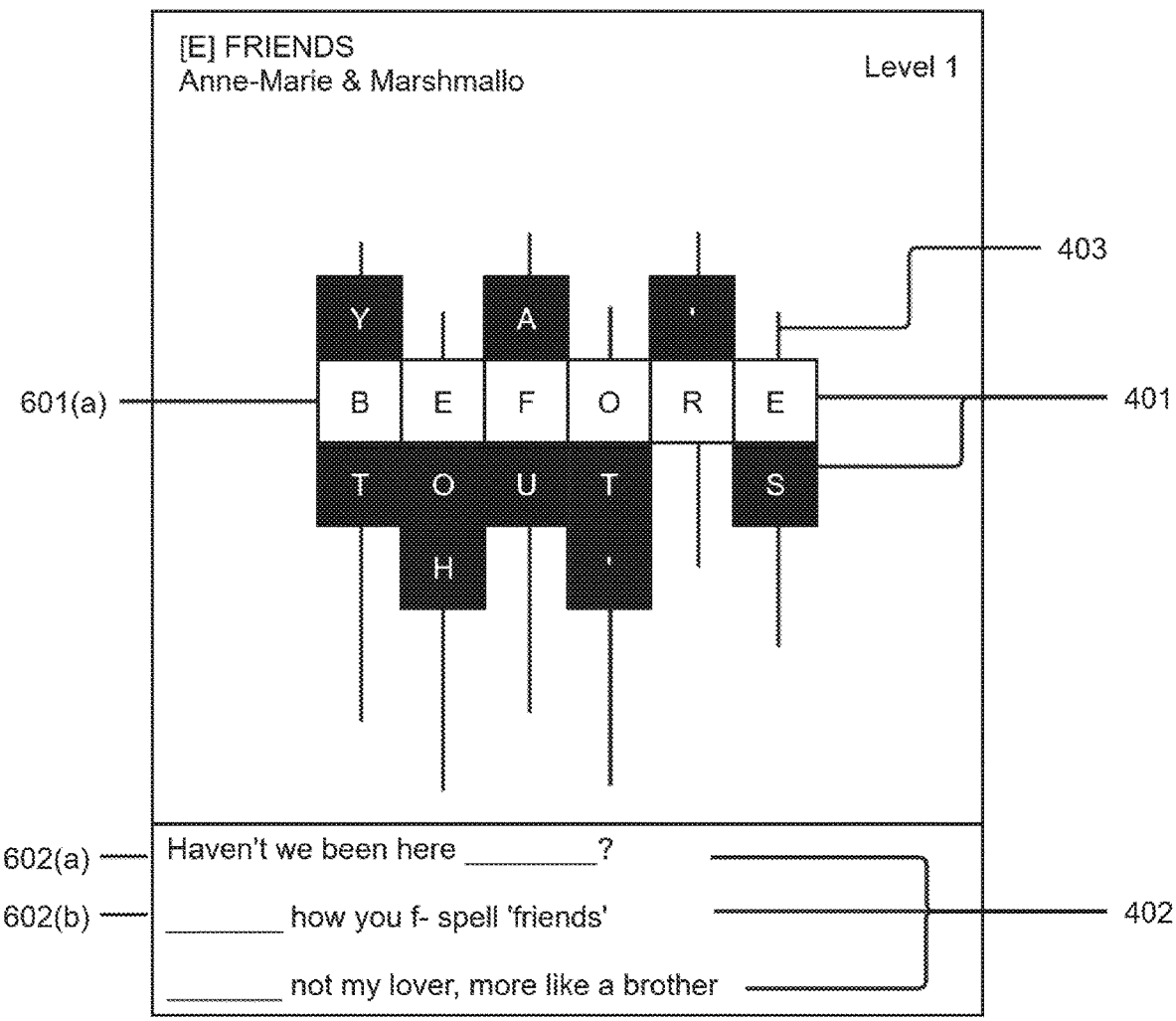
FIG. 6 is a figurative diagram representing an exemplary graphical user interface for a word-find game incorporating dynamic textual content in accordance with the present invention.

Referring now to FIG. 6, an exemplary embodiment of a word-find game in accordance with the present invention is now described and may be generally compared to FIGS. 4 and 5 with respect to the inclusion and relation of game objects 401, text strings 402, and string objects 403. Traditional word-find games may take various forms including word searches or, as is presently described, a sliding tile game whereby a user must create words from combinations of sliding tiles. In accordance with the present invention, words 601 may be generally contemplated as text strings 402 or, in certain embodiments, string objects 403, wherein each tile is a game object 401 comprising a string object 403 in the form of a letter. The matching of related letters into an associated word 601 solves a text string 402. Accordingly, in the present interface, matching a linear sequence of letters B-E-F-O-R-E creates one associated word 601(*a*) "before," solving text string 602(*a*), and reconfiguring the linear sequence of letter to T-H-A-T-'-S creates another associated word "That's," solving text string 602(*b*). In an embodiment, a user may be scored on their successful completion of all or a portion of the presented text strings 402. In another embodiment, a user may be prompted to match the solved word 601 with the associated text string 402, such as matching 601(*a*) to 602(*a*), 601(*b*) to 602(*b*), and so forth.

Figure 7:
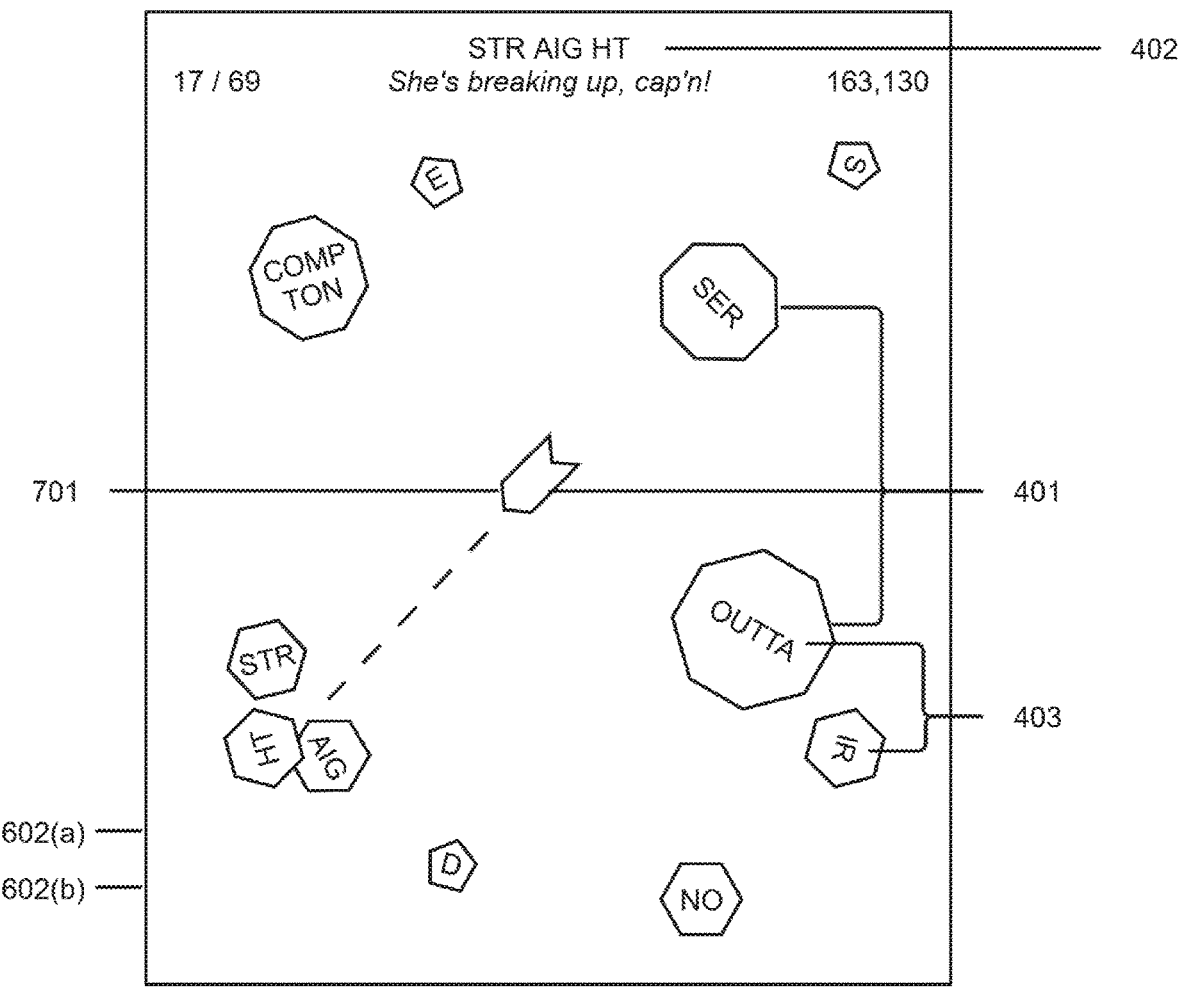
FIG. 7 is a figurative diagram representing an exemplary graphical user interface for a top-down shooter game incorporating dynamic textual content in accordance with the present invention.

Referring now to FIG. 7, an exemplary embodiment of a top-down shooter game in accordance with the present invention is now described and may be generally compared to FIGS. 4, 5, and 6 with respect to the inclusion and relation of game objects 401, text strings 402, and string objects 403. In the present embodiment, a user-controlled avatar 701 targets and shoots various game objects 401, wherein certain game objects 401 are associated with string objects 403. Upon successful targeting and shooting of a string object 403, the game may complete, de-obfuscate, or otherwise progress the completed display of a text string 402. In an embodiment, the user may be required to target and destroy the game objects 401 in order that the associated string objects 403 appear. In another embodiment, the user's destruction of a game object 401 may result in the creation of one or more subsequent game objects 401, each associated with one or more string objects 403. For example, a user may target and destroy an asteroid game object 401 associated with the string object 403 "STRAIGHT," whereby the asteroid breaks into new game objects 401 associated with new string objects 403: "STR", "AIG," and "HT;" similarly, the subsequent destruction of each of those game objects 401 may result in game and string objects for each letter, "S", "T", "R", "A", "I", "G", "H", and "T", and subsequent destruction of those elemental game objects completing the letters of the associated text string.

Still other game types may be contemplated in various alternative embodiments, such as card games, memory games, arcade games, platforming games, puzzle games, RPGs, and other such games comprising game objects with which string objects and text strings may be associated in manners where users may intentionally and selectively interact with game objects, thereby dynamically triggering actions (such as de-obfuscation) between associated string objects and one or more text strings.

Depending on the embodiment, certain acts, events, or functions of any of the algorithms described herein can be performed in a different sequence, can be added, merged, or left out altogether (e.g., not all described acts or events are necessary for the practice of the algorithm) Moreover, in certain embodiments, acts or events can be performed concurrently, e.g., through multi-threaded processing, interrupt processing, or multiple processors or processor cores or on other parallel architectures, rather than sequentially.

Various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Various steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/Page 21 of 30 storage medium. In the alternative, the medium can be integral to the processor. The processor and the medium can reside in an ASIC. The ASIC can reside in a user terminal. In the alternative, the processor and the medium can reside as discrete components in a user terminal.

The term "user interface" as used herein may unless otherwise stated include any input-output module with respect to the hosted server including but not limited to video game interfaces; web portals, such as individual web pages or those collectively defining a hosted website; mobile applications; desktop applications; telephony interfaces such as interactive voice response (IVR); and the like. Such interfaces may in a broader sense include pop-ups or links to third party websites for the purpose of further accessing and/or integrating associated materials, data or program functions via the hosted system and in accordance with methods of the present invention.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

The invention claimed is:

1. An adaptive video game system comprising:
a game server operably linked via a communications network to a game client residing on a user computing device;
said game client configured to execute a game program selected by a user from one or more game programs, each of the one or more game programs comprising specified gameplay objects programmed to interact with one or more dynamic text objects;
wherein the game server is configured to obtain at least one or more text strings associated with a user-defined text source; and
wherein the game client is configured to dynamically apply one or more text objects as generated via a first set of rules associated at least with the selected game program and based on the obtained one or more text strings, to interact with the specified gameplay objects via a second set of rules associated at least with the selected game program,
wherein a first user-defined text source is selectable via the game client with respect to at least a first set of one or more iterations of the game program, and a second user-defined text source comprises at least a first advertisement selected from an ad campaign associated with an ad server,
wherein the game client is configured to execute at least a second set of one or more iterations of the selected game program to interact with one or more text objects generated from at least one or more text strings obtained from the at least first advertisement.

2. The video game system of claim 1, further comprising an ad client configured to enable selection by an associated user of one or more advertisements associated with the ad campaign, the ad campaign to be executed in association with at least one of the one or more game programs further in view of one or more game player profile parameters.

3. The video game system of claim 2, wherein one or more of the ad server, the game server and the game client are configured to determine the at least first advertisement from the ad campaign based on an identified location of the user computing device upon which the game client resides or one or more game player profile parameters associated with a profile of the game player user associated with the user computing device upon which the game client resides.

4. The video game system of claim 1, wherein the game client is configured to receive ambient sound data in real time from an audio receiver associated with the user computing device, said ambient sound data associated with a defined trigger for one or more advertisements of the ad campaign, and wherein the game client is configured to execute the at least second set of one or more iterations of the selected game program to interact with one or more text objects generated from at least one or more text strings obtained from the at one or more advertisements associated with the received ambient sound data.

5. The video game system of claim 1, wherein the game client is configured to dynamically apply, via the second set of rules associated at least with the selected game program, audio elements associated with the text source in time relation with corresponding elements of the generated one or more text objects.

6. The video game system of claim 1, wherein each of the text objects are parsed into a plurality of sub-text objects, and the game client enables the user to interact with the plurality of sub-text objects to arrive at the corresponding text objects during a game.

7. The video game system of claim 1, wherein the text source is defined by sampling an audio recording and the game server is configured to:
convert audio data received therefrom into the one or more text strings, or
identify one or more text strings associated with the audio recording.

8. A method of adapting video game play on demand, the method comprising:
- linking a game server via a communications network to a game client residing on a user computing device;
- executing a game program selected by a user from one or more game programs, each of the one or more game programs comprising specified gameplay objects programmed to interact with one or more dynamic text objects;
- enabling selection via the game client of a first user-defined text source with respect to at least a first set of one or more iterations of the game program;
- enabling selection of a second user-defined text source comprising at least a first advertisement from an ad campaign associated with an ad server;
- obtaining at least one or more text strings associated with a user-defined text source, one or more of the text strings obtained from the first advertisement;
- generating, via a first set of rules associated at least with the selected game program, one or more text objects based on the obtained one or more text strings;
- dynamically applying, via a second set of rules associated at least with the selected game program, the generated one or more text objects to interact with the specified gameplay objects; and
- executing at least a second set of one or more iterations of the selected game program to interact with one or more text objects generated from the one or more of the text strings obtained from the first advertisement.

9. The method of claim 8, further comprising enabling selection by an ad client user of one or more advertisements associated with the ad campaign, the ad campaign to be executed in association with at least one of the one or more game programs further in view of one or more game player profile parameters.

10. The method of claim 9, further comprising determining the at least first advertisement from the ad campaign based on an identified one or more game player profile parameters associated a profile of the game player user associated with the user computing device upon which the game client resides.

11. The method of claim 8, further comprising:
- receiving ambient sound data in real time from an audio receiver associated with the user computing device, said ambient sound data associated with a defined trigger for one or more advertisements of the ad campaign, and
- executing the at least second set of one or more iterations of the selected game program to interact with one or more text objects generated from at least one or more text strings obtained from the at one or more advertisements associated with the received ambient sound data.

12. The method of claim 8, comprising dynamically applying, via the second set of rules associated at least with the selected game program, audio elements associated with the text source in time relation with corresponding elements of the generated one or more text objects.

13. The method of claim 8, comprising parsing each of the text objects into a plurality of sub-text objects, and enabling the user to interact with the plurality of sub-text objects to arrive at the corresponding text objects during a game.

14. The method of claim 8, wherein the text source is defined by sampling an audio recording, the method comprising:
- converting audio data received therefrom into the one or more text strings, or
- identifying one or more text strings associated with the audio recording.

15. An adaptive video game system comprising:
- a game server operably linked via a communications network to a game client residing on a user computing device associated with a first user;
- said game client configured to execute a game program selected by the first user from one or more game programs, each of the one or more game programs comprising specified gameplay objects programmed to interact with one or more dynamic text objects;
- wherein the game server is configured to obtain at least one or more text strings associated with a user-defined text source, wherein the text source comprises a message delivered from a second user to the first user via a message server;
- wherein the game client is configured to dynamically apply one or more text objects as generated via a first set of rules associated at least with the selected game program and based on the obtained one or more text strings, to interact with the specified gameplay objects via a second set of rules associated at least with the selected game program; and
- wherein the game client is configured to execute the game program selected by the first user to interact with the one or more text objects generated from the at least one or more text strings obtained from the message.

16. The adaptive video game system of claim 15, wherein the game client is configured to dynamically apply, via the second set of rules associated at least with the selected game program, audio elements associated with the text source in time relation with corresponding elements of the generated one or more text objects.

17. An adaptive video game system comprising:
- a game server operably linked via a communications network to a game client residing on a user computing device;
- said game client configured to execute a game program selected by a user from one or more game programs, each of the one or more game programs comprising specified gameplay objects programmed to interact with one or more dynamic text objects;
- wherein the game server is configured to obtain at least one or more text strings associated with a user-defined text source; and
- wherein the game client is configured to dynamically apply one or more text objects as generated via a first set of rules associated at least with the selected game program and based on the obtained one or more text strings, to interact with the specified gameplay objects via a second set of rules associated at least with the selected game program,
- wherein the game client enables the user to provide the user-defined text source via one or more of an online search engine and a list of available text sources corresponding to an online database linked to the game server.

18. The adaptive video game system of claim 17, wherein the game client is configured to dynamically apply, via the second set of rules associated at least with the selected game program, audio elements associated with the text source in time relation with corresponding elements of the generated one or more text objects.

19. A method of adapting video game play on demand, the method comprising:
- linking a game server via a communications network to a game client residing on a user computing device;

delivering a message from a first user to a second user via a message server, the second user being associated with the user computing device having the game client residing therein;

executing a game program selected by a user from one or more game programs, each of the one or more game programs comprising specified gameplay objects programmed to interact with one or more dynamic text objects;

obtaining at least one or more text strings associated with a user-defined text source comprising the message and generating, via a first set of rules associated at least with the selected game program, one or more text objects from the at least one or more text strings obtained from the message; and dynamically applying, via a second set of rules associated at least with the selected game program, the generated one or more text objects to interact with the specified gameplay objects.

20. A method of adapting video game play on demand, the method comprising:

linking a game server via a communications network to a game client residing on a user computing device;

executing a game program selected by a user from one or more game programs, each of the one or more game programs comprising specified gameplay objects programmed to interact with one or more dynamic text objects;

enabling the user to provide a user-defined text source via one or more of an online search engine and a list of available text sources corresponding to an online database linked to the game server;

obtaining at least one or more text strings associated with the user-defined text source and generating, via a first set of rules associated at least with the selected game program, one or more text objects based on the obtained one or more text strings; and dynamically applying, via a second set of rules associated at least with the selected game program, the generated one or more text objects to interact with the specified gameplay objects.

* * * * *